Patented June 22, 1943

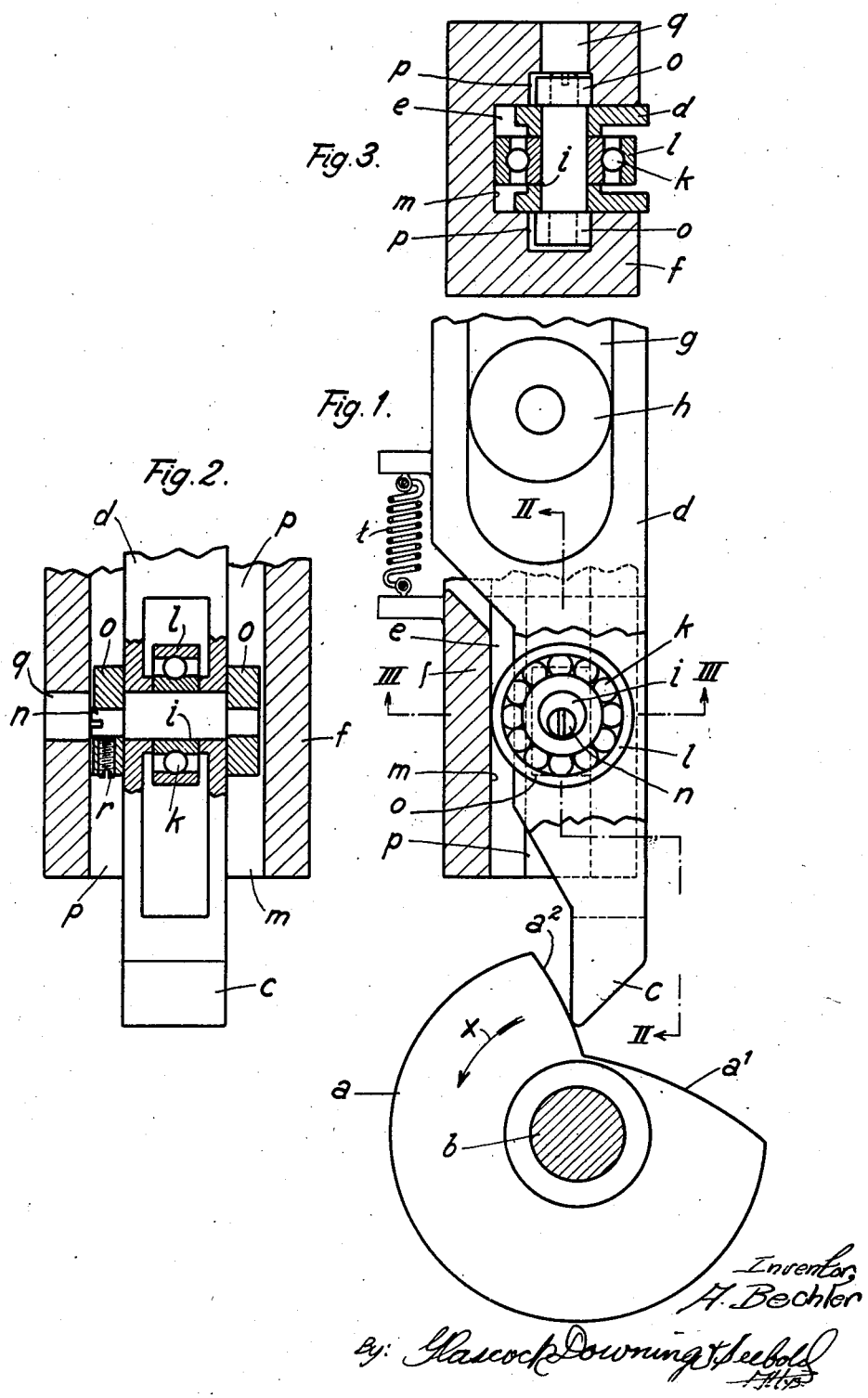

2,322,340

UNITED STATES PATENT OFFICE 2,322,340

DEVICE FOR TRANSMITTING THE MOVEMENT OF A CAM TO ANOTHER PART OF A MACHINE TOOL

André Bechler, Moutier, Switzerland

Application December 13, 1940, Serial No. 370,082
In Switzerland December 30, 1939

3 Claims. (Cl. 74—569)

The present invention relates to a device for transmitting the movement of a cam to another part of a machine tool.

It is of very great importance that, in machine tools, the devices for transmitting those motions which are communicated by the path of a cam to the parts of the machine cooperating with said path, work as easily as possible but without any undesirable play. For this purpose it has already been proposed to mount, on ball bearings, certain organs which, in sliding guides, carry out straight reciprocating movements. This, however, has certain inconveniences. In fact, the motion is not always produced by the cam but it is only controlled by the same when the contact piece, pressed against the cam by a counterspring provided in all devices of this kind, engages a descending part of the cam path. This spring is, very often strongly loaded and, in case the descending part of the path descends steeply, it accelerates the contact piece, which acceleration is undesirable.

The invention remedies these inconveniences.

Its object is to provide a member on the transmitting device which, in the one direction of movement is guided by means of a rolling organ, and, in the other direction, glides on at least one surface braking its speed. In preference this device is formed in such a way that the braking can be adjusted and be adapted to the actual conditions.

In a special embodiment the member carries a ball bearing whose bolt is rotatably mounted on slide members adapted to move in slots provided on the side walls of the guide member, while a bottom of the guide member serves as a support for the outer ring of the ball bearing.

Other objects and features will be apparent as the following description proceeds, reference being had to the accompanying drawing in which:

Fig. 1 is a side elevation of an embodiment, partly in section,

Fig. 2 is a section taken on line II—II of Fig. 1 and

Fig. 3 is a section taken on line III—III of Fig. 1.

The device illustrated is intended to transmit to a non-illustrated tool the motions which are communicated to a contact piece $c$ by the path of a cam $a$ fixed to the camshaft $b$, said contact piece $c$ being constantly pressed against the cam $a$ by a counter spring. This contact piece $c$ forms the lower end of a member $d$ which is adapted to move in the guide channel $e$ of a guide member $f$. This member $d$ is cut out at $g$ and guided by a cylinder $h$. This cylinder and the cut out, together with the device described later on, form the straight line guidance of the member $d$. In the lower part of the member $d$ a bolt $i$ is provided carrying a ball bearing $k$ whose outer ring $l$ is supported on the bottom $m$ of the guide channel $e$. This bolt $i$, on its ends, is provided with pins $n$ lying eccentrically to the axis of said bolt and supported in slide blocks $o$ which, in their turn, move in slots $p$ provided on the side walls of the guide channel $e$.

Through a hole $q$ on the guide member $f$ the pins $n$ may be turned by means of a screw driver in order in this way to alter the pressure on the slide blocks $o$ and the outer ring $l$ of the ball bearing; the pins $n$, after having been turned, are then clamped by means of the screw $r$ in order to maintain the adjusted pressure.

The device illustrated works as follows: The cam $a$ rotates in the direction of the arrow $x$. As soon as the ascending part $a_1$ of the cam path is in contact with the contact piece $c$ in order to move the member $d$ upwards, this ascending part not only exerts a vertical pressure to the contact piece but also a tangential, i. e. a lateral force, so that the member $d$ is supported on the bottom of the channel $e$ by means of the outer ring of the ball bearing $k$ while the slide blocks $o$ are simultaneously lifted off, i. e. are relieved. Although there is practically no perceptible play, the whole lateral force caused by the ascending part of the cam path is taken up by the ball bearing $k$.

When, however, under the effect of the counter spring $t$, the contact piece $c$ is supported on the descending part $a_2$ of the cam $a$, the tangential component of the pressure of this counter spring is opposite to the lateral force exerted by the ascending part of the cam path and the slide blocks $o$, consequently are supported on their slots $p$. The downward motion of the contact piece $c$ is, in this way, braked, and its speed can, thus, not increase. It therefore follows that the arrangement described of the device automatically changes the coefficient of friction of the parts acted upon by the cam.

It is understood that the invention is not necessarily limited to the described and illustrated embodiment, as various changes may be resorted to without departing from the principle of the invention or sacrificing any of its advantages. The rolling organ and the slide members could e. g. be provided on the guide member instead of on the member carrying the contact piece.

What I claim is:

1. In a machine tool, a cam having a cam path with ascending and descending parts, a member pressed against said cam path and adapted to be longitudinally reciprocated by said cam and, on making contact with said ascending parts, to suffer a lateral load in the one, and on making contact with said descending parts, in the other direction, a guide member including a bottom and slots comprising guide surfaces opposite said bottom, adapted to guide said member longitudinally, slide blocks mounted on said member entering said slots, adapted to bear only on said guide surfaces and only when said member makes contact with said descending parts, and an antifriction bearing mounted on said member, adapted to bear only on said bottom and only when said member makes contact with said ascending parts.

2. In a machine tool, a cam having a cam path with ascending and descending parts, a member pressed against said cam path and adapted to be longitudinally reciprocated by said cam and, on making contact with said ascending parts, to suffer a lateral load in the one, and on making contact with said descending parts, in the other direction, a guide member including a bottom and guide surfaces opposite said bottom, adapted to guide said member longitudinally, a bolt journaled in said member, comprising a middle portion and eccentric pins at the ends of said middle portion, slide members carried by said pins and adapted to bear only on said guide surfaces and only when said member makes contact with said descending parts, an antifriction bearing carried by said middle portion and adapted to bear only on said bottom and only when said member makes contact with said ascending parts, and a means of free access on one of said pins adapted to allow said bolt to be turned.

3. In a machine tool, a cam having a cam path with ascending and descending parts, a member pressed against said cam path and adapted to be longitudinally reciprocated by said cam and, on making contact with said ascending parts, to suffer a lateral load in the direction of rotation of said ascending parts, and, on making contact with said descending parts, to suffer a lateral load opposite to the direction of rotation of said descending parts, a guide member comprising a raceway and brake surfaces, a rolling organ mounted on said member, and adapted to engage said raceway only when said member makes contact with said ascending parts, and brake pieces mounted on said member to engage said brake surfaces only when said member makes contact with said descending parts.

ANDRÉ BECHLER.